(12) United States Patent
Wakiya (10) Patent No.: US 10,107,229 B2
(45) Date of Patent: Oct. 23, 2018

(54) CYLINDER HEAD AND INTERNAL COMBUSTION ENGINE

(71) Applicant: TOYOTA JIDOSHA KABUSHIKI KAISHA, Toyota-shi (JP)

(72) Inventor: Tsutomu Wakiya, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 4 days.

(21) Appl. No.: 15/077,002

(22) Filed: Mar. 22, 2016

(65) Prior Publication Data

US 2016/0281634 A1    Sep. 29, 2016

(30) Foreign Application Priority Data

Mar. 25, 2015 (JP) ................................. 2015-062152

(51) Int. Cl.
| | |
|---|---|
| *F01N 13/10* | (2010.01) |
| *F02F 1/42* | (2006.01) |
| *F02F 1/24* | (2006.01) |
| *F01N 3/34* | (2006.01) |
| *F01N 13/00* | (2010.01) |

(52) U.S. Cl.
CPC .............. *F02F 1/4264* (2013.01); *F01N 3/34* (2013.01); *F02F 1/243* (2013.01); *F01N 13/001* (2013.01); *F01N 13/10* (2013.01); *F01N 2270/04* (2013.01); *Y02T 10/20* (2013.01)

(58) Field of Classification Search
CPC .......... F01N 3/34; F01N 13/001; F01N 13/10; F01N 2270/04

USPC ........................... 60/304, 305, 306, 307, 323
See application file for complete search history.

(56) References Cited

U.S. PATENT DOCUMENTS

| 3,965,678 | A | * | 6/1976 | Shiki | ........................ | F01N 3/34 |
|---|---|---|---|---|---|---|
| | | | | | | 60/305 |
| 4,133,175 | A | * | 1/1979 | Katoh | ....................... | F01N 3/34 |
| | | | | | | 60/293 |
| 4,162,613 | A | * | 7/1979 | Tamura | ...................... | F01N 3/30 |
| | | | | | | 60/278 |
| 4,177,640 | A | * | 12/1979 | Kuroda | ...................... | F01N 3/34 |
| | | | | | | 123/184.39 |
| 5,419,125 | A | * | 5/1995 | Fukae | ....................... | F01N 3/28 |
| | | | | | | 60/289 |

(Continued)

FOREIGN PATENT DOCUMENTS

| JP | 53-110711 A | 9/1978 |
|---|---|---|
| JP | 5-86851 | 4/1993 |

(Continued)

*Primary Examiner* — Jorge Leon, Jr.
(74) *Attorney, Agent, or Firm* — Oblon, McClelland, Maier & Neustadt, L.L.P.

(57) ABSTRACT

A cylinder head with which exhaust manifolds are integrated includes a secondary air supply passage configured to include: a main passage disposed above combustion chambers of an engine, and extending along a cylinder line direction; and plural branch passages establishing individual communications between the main passage and corresponding exhaust ports. The respective plural branch passages are so disposed as to be inclined downward from the main passage toward the exhaust ports. Accordingly, it is possible to prevent corrosion of the cylinder head due to stagnation of condensed water.

5 Claims, 7 Drawing Sheets

(56) References Cited

U.S. PATENT DOCUMENTS

| | | | | |
|---|---|---|---|---|
| 8,117,835 B2* | 2/2012 | Mori | ............... | F01N 13/1827 |
| | | | | 277/597 |
| 2003/0119387 A1* | 6/2003 | Takahashi | ............... | B63H 21/24 |
| | | | | 440/88 A |
| 2006/0021336 A1* | 2/2006 | Kokubo | ............... | F01N 3/34 |
| | | | | 60/305 |
| 2007/0095055 A1* | 5/2007 | Jinda | ............... | F01N 3/34 |
| | | | | 60/305 |
| 2009/0013680 A1* | 1/2009 | Iida | ............... | F01N 3/34 |
| | | | | 60/323 |
| 2009/0077952 A1* | 3/2009 | Komuro | ............... | F01N 3/22 |
| | | | | 60/286 |
| 2010/0186396 A1* | 7/2010 | Rippert | ............... | F01N 3/34 |
| | | | | 60/317 |

FOREIGN PATENT DOCUMENTS

| | | |
|---|---|---|
| JP | 10-26018 A | 1/1998 |
| JP | 2000-240506 A | 9/2000 |
| JP | 2004-124823 | 4/2004 |
| JP | 2009-250054 | 10/2009 |
| JP | 2010-163991 | 7/2010 |
| JP | 2014-129748 | 7/2014 |

\* cited by examiner

CYLINDER HEAD AND INTERNAL COMBUSTION ENGINE

INCORPORATION BY REFERENCE

The disclosure of Japanese Patent Application No. 2015-062152 filed on Mar. 25, 2015 including the specification, drawings and abstract is incorporated herein by reference in its entirety.

BACKGROUND

1. Technical Field

The present disclosure relates to a cylinder head of an internal combustion engine and an internal combustion engine installed in an automobile or the like. Particularly, the present disclosure relates to improvement of a configuration of supplying a secondary air to exhaust ports in a cylinder head.

2. Description of Related Art

Japanese Patent Application Publication No. 2009-250054 discloses a configuration of supplying a secondary air to exhaust ports in a cylinder head. The secondary air denotes a secondary air used for the purpose of exhaust purification by combustion of an unburnt gas and rapid temperature increase of a catalyst. JP 2009-250054 A discloses that a downstream part of a supply pipe of the secondary air is branched into plural branch pipes, and the secondary air is individually supplied through these branch pipes to each exhaust port in the cylinder head.

JP 2014-129748 A discloses a cylinder head with which exhaust manifolds are integrated thereinside. Specifically, the cylinder head is configured by integrating therewith port assemblies formed by assembling downstream parts in the exhaust flow direction of respective plural exhaust ports that communicate with corresponding cylinders of a multiple cylinder engine. The port assemblies are open at the cylinder head outer wall surface.

SUMMARY

In the case of providing an engine including a cylinder head of this type with a secondary air supply apparatus, there has been no proposal regarding a specific configuration of a secondary air supply passage that individually supplies a secondary air to each exhaust port in the cylinder head.

The present disclosure provides a secondary air supply passage applicable to a case in which the secondary air supply passage and exhaust gas manifolds are both integrated in a cylinder head.

In some aspects of the disclosure, a cylinder head for an internal combustion engine installed in a vehicle is provided. The internal combustion engine includes plural cylinders and an exhaust system. The cylinder head includes plural exhaust ports communicating with the corresponding plural cylinders, and port assemblies at which downstream parts of the plural exhaust ports in an exhaust flow direction are connected. The cylinder head also includes a secondary air supply passage that supplies a secondary air to the exhaust system. The secondary air supply passage is located more upward than combustion chambers of the internal combustion engine in a state that the internal combustion engine is installed in the vehicle. The secondary air supply passage includes a main passage extending along a cylinder arrangement direction, and plural branch passages establishing individual communications between the main passage and the corresponding exhaust ports. The respective plural branch passages are disposed such as to be inclined downward from the main passage toward the corresponding exhaust ports in the state that the internal combustion engine is installed in the vehicle. The port assemblies are integral with the cylinder head, and opened in an outer wall surface of the cylinder head.

With this particular matter, even if condensed water (condensed water due to dew condensation of moisture contained in the secondary air) is generated in the branch passages of the secondary air supply passage, the respective branch passages are inclined downward from the main passage toward the corresponding exhaust ports, and thus the condensed water flows from the branch passages into the exhaust ports. This condensed water is evaporated by heat received from the exhaust gas flowing through the exhaust ports. When reaching the combustion chambers through the exhaust ports, the condensed water is evaporated by heat received from combustion gas in the combustion chambers. Accordingly, it is possible to prevent corrosion of the cylinder head (corrosion of the inner wall surface of each branch passage) due to stagnation of the condensed water. This means that it is possible to optimize the configuration of the secondary air supply passage in the case of forming the secondary air supply passage in the cylinder head with which the port assemblies are integrated.

In some aspects of the disclosure, a center line of the main passage may be located more upward than respective center lines of the plural branch passages.

According to this configuration, even if condensed water is generated in the main passage of the secondary air supply passage, the condensed water easily flows down from the main passage into the branch passages, and thus the condensed water flows into the respective branch passages flows from the branch passages into the corresponding exhaust ports. Accordingly, it is possible to prevent corrosion of the inner wall surface of the main passage due to stagnation of the condensed water. As a result, it is possible to prevent the entire inner wall surface of the secondary air supply passage from corrosion.

In some aspects of the disclosure, the plural exhaust ports may include first plural exhaust ports and second plural exhaust ports. The port assemblies may include a first port assembly and a second port assembly. The downstream parts of the first plural exhaust ports in the exhaust flow direction may be connected at the first port assembly. The downstream parts of the second plural exhaust ports in the exhaust flow direction may be connected, at the second port assembly. Only the first plural exhaust ports may be connected to the main passage by the branch passages.

According to this configuration, it is possible to reduce exhaust interference caused by the exhaust gas flowing through the secondary air supply passage. Specifically, the exhaust ports located more upstream in the exhaust flow direction than the second port assembly do not communicate with the exhaust ports located more upstream in the exhaust flow direction than the first port assembly via the secondary air supply passage. Hence, the exhaust gas flowing through the exhaust ports located more upstream in the exhaust flow direction than the second port assembly is prevented from flowing into the exhaust ports located more upstream in the exhaust flow direction than the first port assembly via the secondary air supply passage, thereby preventing exhaust interference. In this manner, exhaust interference is prevented between the exhaust ports of which downstream parts in the exhaust flow direction communicating with the first port assembly and the exhaust ports of which downstream parts in the exhaust flow direction communicating with the second port assembly.

In some aspects of the disclosure, an internal combustion engine for a vehicle is provided. The internal combustion engine is configured to be installed in the vehicle. The internal combustion engine includes plural cylinders, cylinder head, and an exhaust system. The cylinder head including plural exhaust ports communicating with the corresponding plural cylinders, port assemblies at which downstream parts of the plural exhaust ports in an exhaust flow direction are connected, and a secondary air supply passage that supplies a secondary air to the exhaust system. The secondary air supply passage are located more upward than combustion chambers of the internal combustion engine in a state that the internal combustion engine is installed in the vehicle. The secondary air supply passage includes a main passage extending along a cylinder arrangement direction, and plural branch passages establishing individual communications between the main passage and the corresponding exhaust ports. The respective plural branch passages are disposed such as to be inclined downward from the main passage toward the corresponding exhaust ports in the state that the internal combustion engine is installed in the vehicle. The port assemblies are integral with the cylinder head, and opened in an outer wall surface of the cylinder head.

In the present disclosure, relative to the cylinder head with which the exhaust port assemblies are integrated, the branch passages of the secondary air supply passage communicating with the exhaust ports are configured to be inclined downward toward the exhaust ports. Through this, it is possible to prevent corrosion due to stagnation of condensed water in the branch passages, and thus it is possible to optimize the configuration of the secondary air supply passage in the case of integrating the secondary air supply passage with the cylinder head of this type.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, embodiments of the present disclosure will be described with reference to drawings. In the present embodiment, a case of applying the present disclosure to a cylinder head of an in-line 4-cylinder gasoline engine (multi-cylinder internal combustion engine) installed in an automobile will be described.

Figure 1:
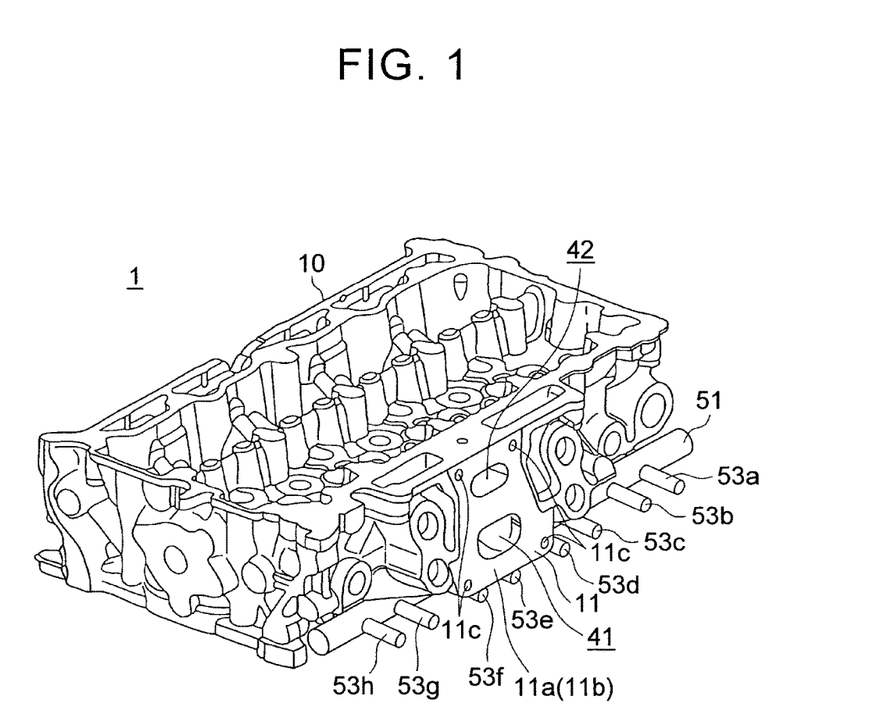
FIG. 1 is a perspective view of a cylinder head according to an embodiment as viewed from obliquely above on an exhaust side.
Figure 2:
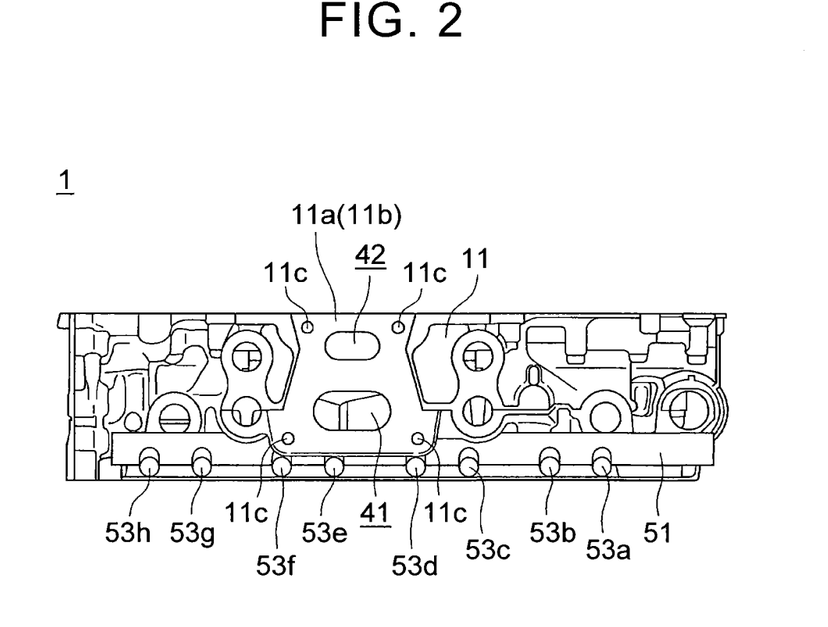
FIG. 2 is a front view of the cylinder head according to the embodiment as viewed from the exhaust side.
Figure 3:
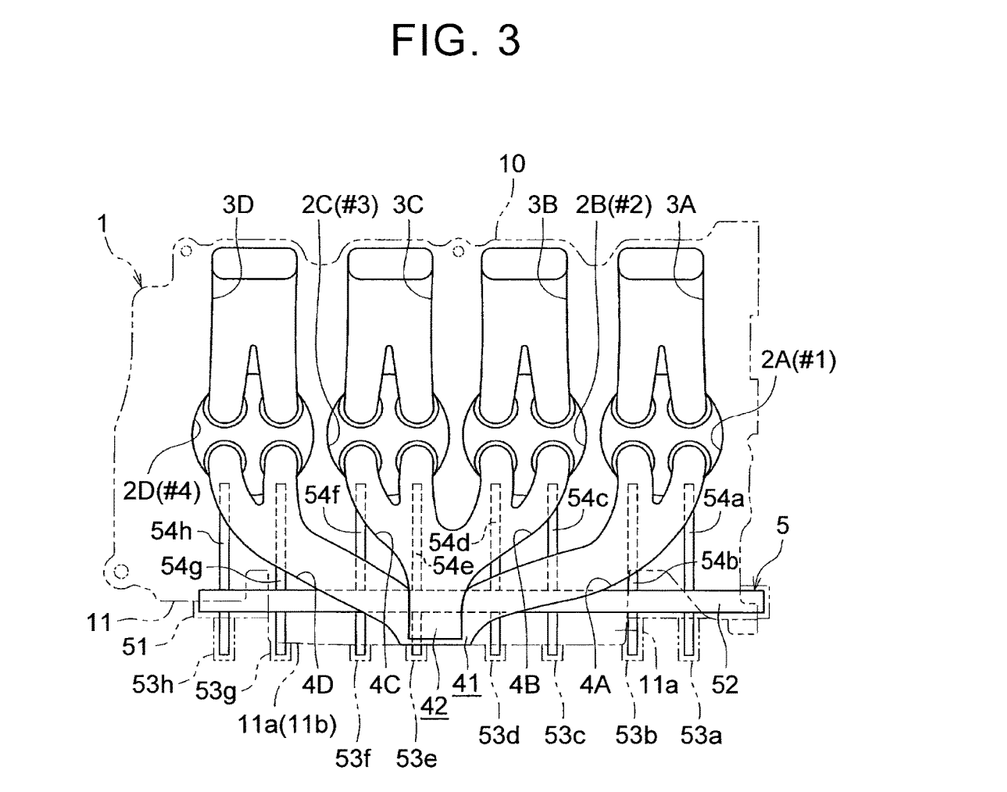
FIG. 3 is a drawing showing an outline of a layout of cylinders, intake ports, exhaust ports, and a secondary air supply passage if the cylinder head according to the embodiment is perspectively viewed from above.

FIG. 1 is a perspective view of the cylinder head 1 according to the present embodiment as viewed from obliquely above on an exhaust side. FIG. 2 is a front view of the cylinder head 1 according to the embodiment as viewed from the exhaust side. FIG. 3 is a drawing showing an outline of a layout of cylinders 2A, 2B, 2C, 2D, intake ports 3A, 3B, 3C, 3D, exhaust ports 4A, 4B, 4C, 4D, and a secondary air supply passage 5 if the cylinder head 1 is perspectively viewed from above.

The cylinder head 1 is assembled to an upper part of a not-shown cylinder block, and respective upper parts of the four cylinders 2A to 2D (see FIG. 3) formed in the cylinder block are closed, and combustion chambers are formed thereinside between these cylinders and pistons (not shown) inserted in the respective cylinders 2A to 2D.

In the engine according to the present embodiment, as shown in FIG. 3, in the order from the right to the left in the drawing, the cylinder 2A of a first cylinder #1, the cylinder 2B of a second cylinder #2, the cylinder 2C of a third cylinder #3, and the cylinder 2D of a fourth cylinder #4 are arranged in a line. Although not shown in the drawings, in a lower surface of the cylinder head 1, shallow recesses are formed for the respective cylinders in a manner as to serve as ceilings of the respective combustion chambers, and downstream ends of the intake ports 3A to 3D, and upstream ends of the exhaust ports 4A to 4D are respectively opened in the corresponding recesses. Intake valves (not shown) are respectively provided to corresponding downstream end portions of the intake ports 3A to 3D, and exhaust valves (not shown) are respectively provided to corresponding upstream end portions of the exhaust ports 4A to 4D.

As shown in FIG. 3, the four intake ports 3A to 3D to introduce air to the respective combustion chambers of the cylinders 2A to 2D are opened in a side wall 10 on the intake side of the cylinder head 1, which is located on a back side in the drawing of FIG. 1 (upper side in the drawing of FIG. 3). Not-shown intake manifolds are connected to this side wall 10.

Meanwhile, parts of exhaust manifolds are integrated with a side wall 11 on the exhaust side of the cylinder head 1 located on a front side in the drawing of FIG. 1 (lower side in the drawing of FIG. 3). Specifically, as shown in FIG. 1, a bulging portion 11a in a substantially rectangular shape is formed near a center in a longitudinal direction (cylinder line direction). In the bulging portion 11a, the four exhaust ports 4A to 4D are assembled into two groups, and are then vertically separated apart from each other, and opened in a fastening seat 11b (outer wall surface on the exhaust side of the cylinder head 1) formed in the bulging portion 11a. As shown in FIG. 1, a bolt hole 11c is formed at each of the four corners of the fastening seat 11b, and a not-shown exhaust pipe is coupled to the fastening seat 11b using these bolt holes 11c.

The engine according to the present embodiment is a four-cylinder engine. Hence, downstream ends of the intake ports 3A to 3D and upstream ends of the exhaust ports 4A to 4D are respectively so branched as to communicate with the corresponding combustion chambers.

In the present embodiment, among the four exhaust ports 4A to 4D, the outer exhaust ports 4A, 4D respectively communicating with the cylinder 2A of the first cylinder 41 and the cylinder 2D of the fourth cylinder 44 located at both outer positions in the cylinder line direction are comparatively greatly curved in a manner as to gradually approach the center of the cylinder line direction toward the downstream of the exhaust flow. These outer exhaust ports 4A, 4D are assembled in the bulging portion 11a, and this assembled part is opened in a lower part of the fastening seat 11b as shown in FIG. 1 and FIG. 2. Hereinafter, this assembled part is referred to as a lower port assembly 41. In this manner, the downstream parts in the exhaust flow direction of the outer exhaust ports 4A, 4D are assembled into the lower port assembly 41, and this lower port assembly 41 is opened in the fastening seat 11b that is a cylinder head outer wall surface.

On the other hand, the exhaust ports 4B, 4C respectively communicating with the cylinder 2B of the second cylinder #2 and the cylinder 2C of the third cylinder #3 located at inner positions in the cylinder line direction gradually come closer to each other toward the downstream of the exhaust flow so as to be assembled, and this assembled part is inclinedly curved upward, extend beyond the assembly of the outer exhaust ports 4A, 4D (lower port assembly 41), and thereafter, is opened in an upper part of the fastening seat 11b. Hereinafter, this assembled part is referred to as an upper port assembly 42. In this manner, the downstream parts in the exhaust flow direction of the inner exhaust ports 4B, 4C are assembled into the upper port assembly 42, and this upper port assembly 42 is opened in the fastening seat 11b that is the head outer wall surface.

As aforementioned, in the present embodiment, the outer exhaust ports 4A, 4D are greatly curved in the cylindrical line direction are extended to the fastening seat 11b without being curved in the vertical direction. The inner exhaust ports 4B, 4C are not greatly curved in the cylindrical line direction, but greatly curved in the vertical direction. Accordingly, a difference in length among the four exhaust ports 4A to 4D is reduced. Therefore, variation in amount of heat received by the cylinder head 1 from the exhaust gas at a high temperature flowing through the insides of these exhaust ports becomes reduced. Consequently, it is advantageous in guarantee of reliability.

In the cylinder head 1 according to the present embodiment, the secondary air supply passage 5 is integrally formed. The secondary air passage 5 is to supply a secondary air for the purpose of exhaust purification by combustion of an unburnt gas and rapid temperature increase of a catalyst in an exhaust system. Hereinafter, the secondary air supply passage 5 will be described.

Figure 4:
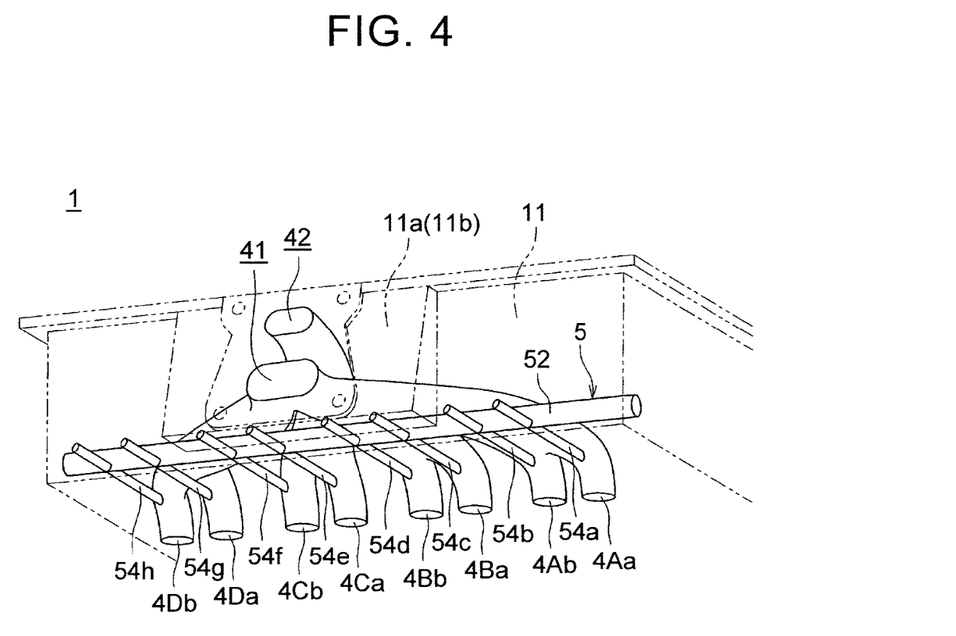
FIG. 4 is a perspective view showing the exhaust ports and the secondary air supply passage formed inside the cylinder head according to the embodiment.
Figure 5:
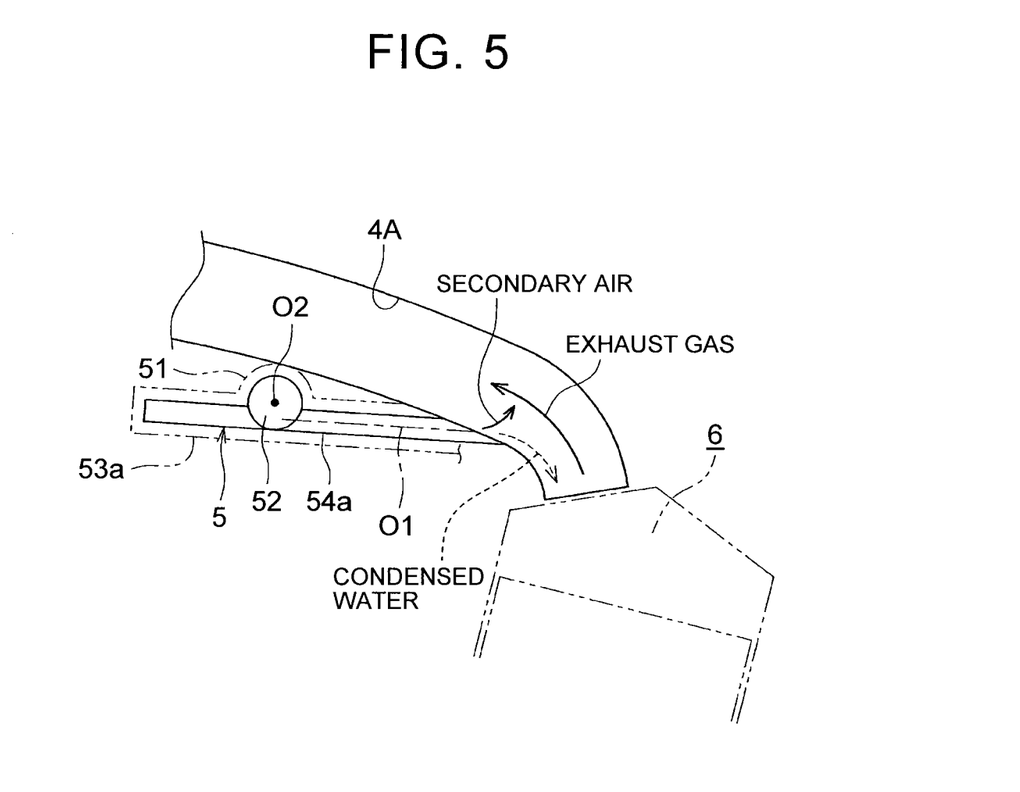
FIG. 5 is a schematic view of the exhaust port and the secondary air supply passage as viewed from a direction along a cylinder line in a state in which an engine is installed in a vehicle.

FIG. 4 is a perspective view showing the exhaust ports 4A to 4D formed inside the cylinder head 1 according to the present embodiment and the secondary air supply passage 5. In FIG. 4, an external form of the cylinder head 1 is indicated by two-dot chain lines, and the exhaust ports 4A to 4D and the secondary air supply passage 5 are indicated by solid lines. That is to say, shapes of inner wall surfaces of the exhaust ports 4A to 4D and the secondary air supply passage 5 are shown in FIG. 4. FIG. 5 is a schematic view of the exhaust port 4A and the secondary air supply passage 5 as viewed from the direction along the cylinder line in a state in which the engine is installed in a vehicle.

As shown in FIG. 1 to FIG. 5, in a lower part of the bulging portion 11a in the side wall 11 on the exhaust side of the cylinder head 1, there are integrally formed a main passage forming portion 51 for forming a main passage 52 of the secondary air supply passage 5, and plural branch passage forming portions 53a to 53h for respectively forming plural branch passages 54a to 54h. The cylinder head 1 is formed by casting an aluminum alloy, for example. The main passage forming portion 51 and the branch passage forming portions 53a to 53h are so formed as to be integrated with the side wall 11 on the exhaust side of the cylinder head 1 during the casting of the cylinder head 1.

The main passage forming portion 51 is formed into a pipe shape horizontally extending along the cylinder line direction of the cylinder head 1. At a center portion of the main passage forming portion 51, there is formed a main passage 52 extending along a center line of the center portion, and having a predetermined inner diameter dimension. Hence, the main passage 52 also extends along the cylinder line direction of the cylinder head 1.

As shown in FIG. 5, the main passage 52 is located above the combustion chambers 6 in the state in which the engine is installed in the vehicle (an internal combustion engine installation state referred to in the present disclosure).

One longitudinal end (e.g., a left end in FIG. 2) of the main passage 52 is closed. As an example of a configuration of closing one end of the main passage 52, this one end may be closed at the time of the casting, or after one end is opened, the one end may be closed by a not-shown plug serving as a sealing member. On the other hand, a secondary air supply pump is connected to the other longitudinal end (e.g., a right end in FIG. 2) of the main passage 52 via a not-shown air supply pipe. The secondary air supply pump is operated in response to demand on the secondary air supply to the exhaust system so as to supply the secondary air to the main passage 52. Control on the operation of the secondary air supply pump is well-known; therefore, description thereof will be omitted herein.

The respective branch passage forming portions 53a to 53h extend in a direction substantially vertical to the cylindrical line direction. In other words, the branch passage forming portion 53a to 53h are arranged substantially vertical to an extending direction of the main passage forming portion 51. At respective center portions of these branch passage forming portions 53a to 53h, branch passages 54a to 54h are placed. Each of the branch passages 54a to 54h are extending along the center line of each corresponding center portion of the branch passage forming portions 53a to 53h, and having a predetermined inner diameter dimension.

More specifically, as shown in FIG. 4 and FIG. 5, the branch passages 54a to 54h establish individual communications between the main passage 52 and the corresponding exhaust ports 4A to 4D. In FIG. 5, only the branch passage 54a and the exhaust port 4A are shown. As aforementioned, the upstream ends of the exhaust ports 4A to 4D are respectively branched and communicate with the corresponding combustion chambers. Specifically, two exhaust ports are connected to each combustion chamber, and thus eight exhaust ports 4Aa, 4Ab, 4Ba, 4Bb, 4Ca, 4Cb, 4Da, 4Db (see FIG. 4) are provided in total. Hence, the branch passages 54a to 54h are provided by eight so as to correspond to these exhaust ports 4Aa to 4Db. Connected positions of the branch passages 54a to 54h corresponding to the respective exhaust ports 4Aa to 4Db are preferably as close as possible to the upstream end positions of the exhaust ports 4Aa to 4Db. The upstream end positions are on the combustion chamber side in the exhaust ports 4Aa to 4Db. This is for the sake of supplying the secondary air into the exhaust gas at a temperature as high as possible so as to securely perform combustion of an unburnt gas. A fuel injection control for sufficiently exerting effect by this secondary air supply is carried out by setting an air-fuel ratio in each cylinder to be smaller (richer) than a stoichiometric air-fuel ratio therein.

A first end (the left end in FIG. 5) that is positioned opposite to the connected position in each branch passage

54a to 54h is closed. As an example of a configuration of closing the first end of each branch passage 54a to 54h, the first end may be formed to be closed at the time of the casting. For another example, the first end may be formed to be open, then closed by a not-shown plug serving as a sealing member.

As shown in FIG. 5, a center line O1 (branch-passage center line) of each branch passage 54a to 54h is located below a center line O2 of the main passage 52. In other words, the center line O2 of the main passage 52 is located above the center line O1 of each branch passage 54a to 54h. Through this, it is configured that the lower end portion of the main passage 52 and the upper end portion of each branch passage 54a to 54h communicate with each other. The lower end portion is at a lower end of the inner wall surface of the main passage 52. The upper end portion is at an upper end of the inner wall surface of each branch passage 54a to 54h.

As shown in FIG. 5, in the state in which the engine is installed in the vehicle, these branch passages 54a to 54h are inclined downward from the main passage 52 toward the exhaust ports 4A to 4D. The state above is also called "the engine installation state". Specifically, the connected positions of the branch passages 54a to 54h to the corresponding exhaust ports 4A to 4D are located below the communicating positions of the branch passages 54a to 54h with the main passage 52; therefore, each of the branch passages 54a to 54h is configured to be inclined downward from the main passage 52 toward the exhaust ports 4A to 4D. For example, if the vehicle is positioned on a horizontal road surface, the respective branch passages 54a to 54h are inclined downward from the main passage 52 to the corresponding exhaust ports 4A to 4D with an angle of inclination of approximately 5° relative to a horizontal direction.

Specifically, in a state in which a body of the cylinder head 1 is placed on a horizontal plane, in other words, in a state before the cylinder head 1 is assembled to the cylinder block or the like, the respective branch passages 54a to 54h are inclined upward from the main passage 52 toward the corresponding exhaust ports 4A to 4D. An angle of this inclination is set to be 10°, for example. In the state in which the engine is installed in the vehicle, the engine is installed with an installation angle of 15°. The engine is inclined at an angle of 15° so as to locate the intake side downward. Hence, in the state in which the engine is installed in the vehicle, the respective branch passages 54a to 54h are inclined downward from the main passage 52 toward the corresponding exhaust ports 4A to 4D with an angle of inclination of 5°, for example. These angles are not limited to the above values, and any angle may be set as far as a condensed water can be flown flows down toward the exhaust ports 4A to 4D if the condensed water is generated in the branch passages 54a to 54h.

The secondary air supply passage 5 is provided in the above manner that the respective branch passages 54a to 54h are inclined downward from the main passage 52 toward the corresponding exhaust ports 4A to 4D. Therefore, even if a condensed water is generated due to dew condensation of moisture contained in the secondary air in the branch passages 54a to 54h of the secondary air supply passage 5 during the operation of the engine, the condensed water flows from the branch passages 54a to 54h into the exhaust ports 4A to 4D (see an arrow in a broken line of FIG. 5). This condensed water is evaporated by heat received from the exhaust gas flowing through the exhaust ports 4A to 4D. If the condensed water reaches the combustion chambers 6 through the exhaust ports 4A to 4D, the condensed water is evaporated by heat received from combustion gas in the combustion chambers 6. Accordingly, it is possible to prevent corrosion of the inner wall surface of each branch passage 54a to 54h due to stagnation of the condensed water.

As aforementioned, the center line O1 of the main passage 52 is located above the center line O1 of each branch passage 54a to 54h. Hence, even if a condensed water is generated in the main passage 52, the condensed water easily flows down from the main passage 52 into the branch passages 54a to 54h. Then, the condensed water flows from the branch passages 54a to 54h into the corresponding exhaust ports 4A to 4D. Accordingly, it is possible to prevent corrosion of the inner wall surface of the main passage 52 due to stagnation of the condensed water. As a result, it is possible to prevent the entire inner wall surface of the secondary air supply passage 5 from corrosion.

As aforementioned, according to the present embodiment, it is possible to optimize the configuration of the secondary air supply passage 5 in the case of integrating the secondary air supply passage 5 with the cylinder head 1 with which the exhaust manifolds are integrated. That is to say, the cylinder head is integral with the port assemblies 41, 42.

Hereinafter, a variation will be described. The present variation is different from the aforementioned embodiment in the configuration of the secondary air supply passage 5. Herein, differences from the aforementioned embodiment will mainly be described.

Figure 6:
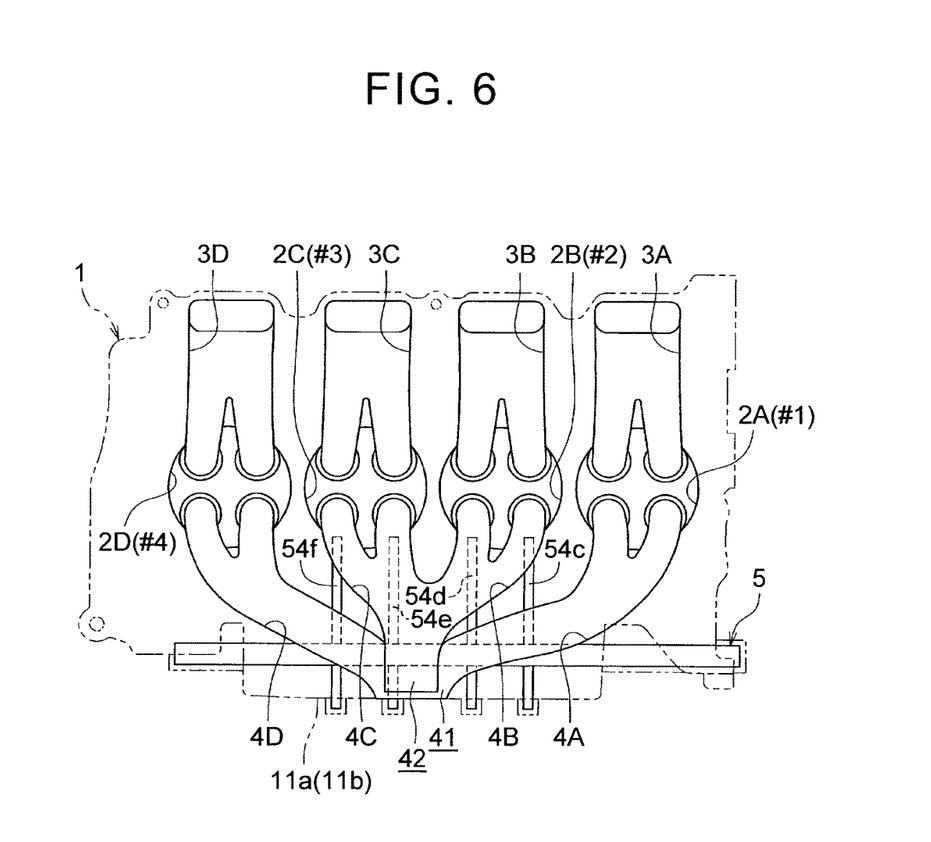
FIG. 6 is a drawing corresponding to FIG. 3 in a variation.
Figure 7:
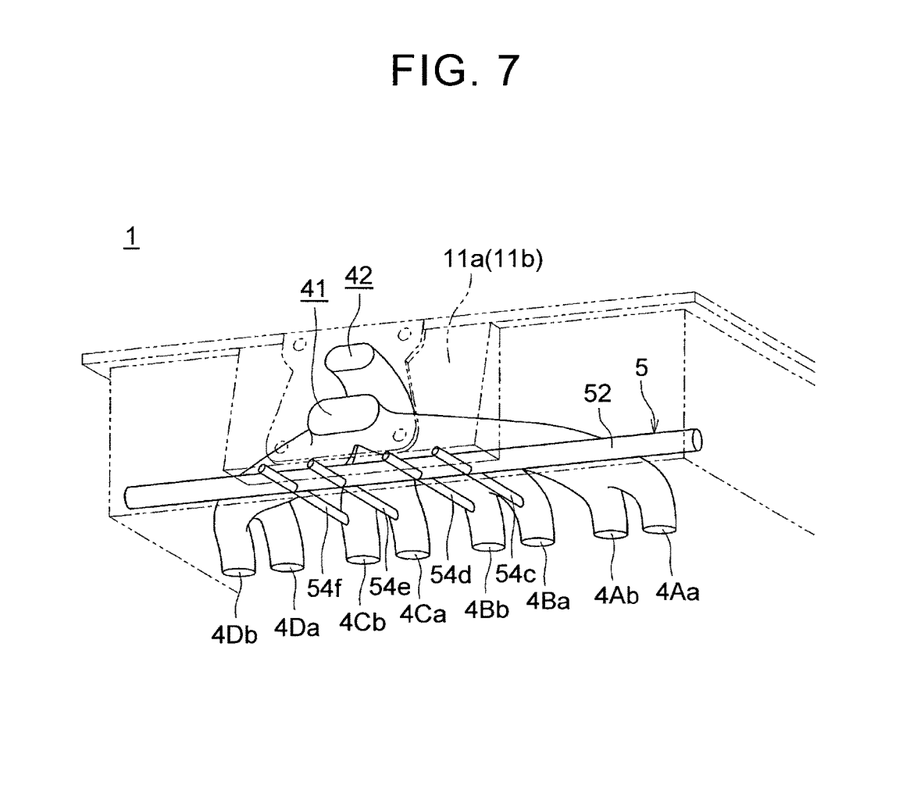
FIG. 7 is a drawing corresponding to FIG. 4 in a variation.

FIG. 6 is a drawing corresponding to FIG. 3 in the present variation. The drawing shows a layout of cylinders 2A to 2D, the intake ports 3A to 3D, the exhaust ports 4A to 4D, and the secondary air supply passage 5 as perspectively viewed from above of the cylinder head 1. FIG. 7 is a drawing corresponding to FIG. 4 in the present variation. FIG. 7 is a perspective view showing the exhaust ports 4A to 4D (4Aa to 4Db) formed inside the cylinder head 1 and the secondary air supply passage 5.

As shown in these drawings, the branch passages of the secondary air supply passage 5 in the present variation is configured to correspond to only the inner exhaust ports 4B and 4C (4Ba, 4Bb, 4Ca, 4Cb). The inner exhaust ports 4B, 4C (4Ba, 4Bb, 4Ca, 4Cb) respectively communicate with the cylinder 2B of the second cylinder #2 and the cylinder 2C of the third cylinder #3. Specifically, it is configured that only the inner exhaust ports 4B, 4C (4Ba, 4Bb, 4Ca, 4Cb) communicate with the main passage 52 via the branch passages 54c, 54d, 54e, 54f.

In other words, there exist no branch passages corresponding to the above outer exhaust ports 4A and 4D (4Aa, 4Ab, 4Da, and 4Db). The outer exhaust ports 4A, 4D (4Aa, 4Ab, 4Da, 4Db) respectively communicate with the cylinder 2A of the first cylinder #1 and the cylinder 2D of the fourth cylinder #4.

In the present variation, the upper port assembly 42 is configured as a first port assembly referred to in the present disclosure, and the lower port assembly 41 is configured as a second port assembly referred to in the present disclosure.

Through this configuration, it is possible to reduce exhaust interference caused by the exhaust gas flowing through the secondary air supply passage 5. The outer exhaust ports 4A, 4D are located more upstream in the exhaust flow direction than the lower port assembly 41, and the inner exhaust ports 4B, 4C are located more upstream in the exhaust flow direction than the upper port assembly 42. The outer exhaust ports 4A, 4D do not communicate with the inner exhaust ports 4B, 4C via the secondary air supply passage 5. Hence, the exhaust gas flowing through the outer exhaust ports 4A, 4D is prevented from flowing into the inner exhaust ports 4B, 4C, thus causing no exhaust interference. Accordingly, the exhaust interference is prevented between the outer exhaust ports 4A, 4D and the inner exhaust ports 4B, 4C.

The configuration of the present variation is particularly effective for an engine equipped with a twin scroll turbocharger. This twin scroll turbocharger is configured to branch a flow passage to introduce an exhaust gas to a turbine wheel into two. This configuration is for the purpose of reducing interference of exhaust energy from other cylinders so as to promote rapid start-up of rotation of the turbine in a low-rotation region. However, the configuration that all the exhaust ports 4A to 4D communicate with the secondary air supply passage 5 might cause the above exhaust interference, then the effect of the twin scroll turbocharger such as the rapid start-up of rotation of the turbine might not be sufficiently exerted. As one method for reducing the exhaust interference, it may be considered to set a passage diameter of each passage, such as the main passage 52 and the branch passages 54a to 54h, of the secondary air supply passage 5 to be smaller. The disclosing party of the present disclosure has confirmed through experiments that, in the configuration of the aforementioned embodiment, the engine performance becomes increased by setting each diameter of the branch passages 54a to 54h to be smaller.

However, if each passage diameter of the main passage 52 and the branch passages 54a to 54h is set to be smaller, suppliable amount of the secondary air might become reduced. Therefore, it becomes difficult to sufficiently exert the effect of exhaust purification by combustion of an unburnt gas and rapid temperature increase of a catalyst brought by installation of the secondary air supply apparatus.

In the present variation, only the inner exhaust ports 4B, 4C are configured to communicate with the main passage 52 through the branch passages. The inner exhaust ports 4B, 4C communicate with one of the two flow passages to introduce the exhaust gas to the turbine wheel of the twin scroll turbocharger. Accordingly, while supply amount of the secondary air to the inner exhaust ports 4B, 4C is sufficiently secured, it is possible to reduce the exhaust interference. Thus, it is possible to sufficiently exert the effect of the twin scroll turbocharger.

In the aforementioned embodiment and variation, it is configured that the exhaust ports 4A to 4D are divided and assembled into two groups, thereafter, are respectively opened in the fastening seat 11b with a distance therebetween in the vertical direction. Specifically, the aforementioned embodiment and variation have been described by using the case of applying the present disclosure to the cylinder head 1 including two port assemblies: the lower port assembly 41 and the upper port assembly 42, as the port assemblies. The present disclosure is not limited to this, and is also applicable to a cylinder head including a single port assembly formed by assembling all exhaust ports, or to a cylinder head including three or more port assemblies.

In addition, the aforementioned embodiment and variation has been described by using the case of applying the present disclosure to the in-line 4-cylinder gasoline engine installed in the vehicle. The present disclosure is not limited to a gasoline engine, and is also applicable to a diesel engine. The present disclosure is not limited to a four cylinder engine, and is also applicable to an engine with three or less cylinders, or an engine with five or more cylinders. The present disclosure is also applicable to an engine application other than a vehicle.

The present disclosure is applicable to a cylinder head with which exhaust manifolds are integrated, and inside which a secondary air supply passage is formed.

What is claimed is:

1. A cylinder head for an internal combustion engine installed in a vehicle, the internal combustion engine including plural cylinders and an exhaust system, the cylinder head comprising:
   plural exhaust ports each of which individually communicates with a corresponding cylinder of the plural cylinders;
   port assemblies each including at least two of the plural exhaust ports each of which communicates with a different cylinder of the plural cylinders, the plural exhaust ports being connected at a downstream part in an exhaust flow direction; and
   a secondary air supply passage that supplies a secondary air to the exhaust system,
   the secondary air supply passage being located more upward than combustion chambers of the internal combustion engine in a state that the internal combustion engine is installed in the vehicle,
   the secondary air supply passage including a main passage extending along a cylinder arrangement direction, and plural branch passages establishing individual communications between the main passage and the corresponding exhaust ports,
   the respective plural branch passages being disposed such as to be inclined downward from the main passage toward the corresponding exhaust ports in the state that the internal combustion engine is installed in the vehicle,
   the port assemblies being within the cylinder head, the port assemblies being opened in an outer wall surface of the cylinder head, and downstream ends of the port assemblies terminate at the outer wall surface of the cylinder head,
   a center line of the main passage is inward of the downstream ends of the port assemblies,
   the plural branch passages each includes a first portion extending from the main passage to the corresponding exhaust ports and a second portion extending from the main passage in a direction opposite of the first portion, and
   ends of the respective second portions are outward of the downstream ends of the port assemblies.

2. The cylinder head according to claim 1, wherein the center line of the main passage is located more upward than respective center lines of the plural branch passages.

3. The cylinder head according to claim 1, wherein the plural exhaust ports include first plural exhaust ports and second plural exhaust ports, and
   the port assemblies include a first port assembly and a second port assembly, the first port assembly at which downstream parts of the first plural exhaust ports in the exhaust flow direction are connected, and the second port assembly at which downstream parts of the second plural exhaust ports in the exhaust flow direction are connected.

4. The cylinder head according to claim 1, wherein the port assemblies are opened in the outer wall surface of the cylinder head at locations above a center line of the main passage.

5. An internal combustion engine for a vehicle, the internal combustion engine installed in the vehicle, the internal combustion engine comprising:

plural cylinders, cylinder head, and an exhaust system, wherein the cylinder head including plural exhaust ports each of which individually communicates with one cylinder of the plural cylinders, port assemblies each including at least one of the plural exhaust ports each of which communicates with a different cylinder of the plural cylinders, the plural exhaust ports being connected at a downstream part in an exhaust flow direction, and a secondary air supply passage that supplies a secondary air to the exhaust system, the secondary air supply passage being located more upward than combustion chambers of the internal combustion engine in a state that the internal combustion engine is installed in the vehicle, the secondary air supply passage including a main passage extending along a cylinder arrangement direction, and plural branch passages establishing individual communications between the main passage and the corresponding exhaust ports, the respective plural branch passages being disposed such as to be inclined downward from the main passage toward the corresponding exhaust ports in the state that the internal combustion engine is installed in the vehicle, the port assemblies being within the cylinder head, the port assemblies being opened in an outer wall surface of the cylinder head, and downstream ends of the port assemblies terminate at the outer wall surface of the cylinder head, a center line of the main passage is inward of the downstream ends of the port assemblies, the plural branch passages each includes a first portion extending from the main passage to the corresponding exhaust ports and a second portion extending from the main passage in a direction opposite of the first portion, and ends of the respective second portions are outward of the downstream ends of the port assemblies.

* * * * *